United States Patent [19]

Kinoshita

[11] Patent Number: 4,809,831
[45] Date of Patent: Mar. 7, 1989

[54] ONE-WAY SPRAG CLUTCH AND ASSEMBLY METHOD OF SPRAGS IN RETAINER

[75] Inventor: Yoshio Kinoshita, Kanagawa, Japan

[73] Assignee: NSK-Warner K. K., Japan

[21] Appl. No.: 60,448

[22] Filed: Jun. 11, 1987

[30] Foreign Application Priority Data

Jun. 20, 1986 [JP] Japan .............................. 61-94018[U]

[51] Int. Cl.$^4$ ........................ F16D 11/06; F16D 15/00
[52] U.S. Cl. .................................. 192/41 A; 192/45.1
[58] Field of Search ........................... 192/45.1, 41 A; 188/82-87

[56] References Cited

U.S. PATENT DOCUMENTS

| 2,624,436 | 1/1953 | Gamble | 192/45.1 |
|---|---|---|---|
| 2,677,448 | 5/1954 | Gillespile | 192/45.1 |
| 2,724,471 | 11/1955 | Dodge | 192/45.1 |
| 2,824,636 | 2/1958 | Troendly et al. | 192/45.1 |
| 3,324,980 | 6/1967 | Rojic et al. | 192/45.1 |
| 3,598,202 | 8/1971 | Giese | 192/41 A X |
| 3,643,768 | 2/1972 | Titt | 192/41 A |
| 3,952,849 | 4/1976 | Brownhill et al. | 192/45.1 X |
| 4,114,739 | 9/1978 | Colonna et al. | 192/45.1 X |
| 4,522,289 | 6/1985 | Giese et al. | 192/41 A |
| 4,682,677 | 7/1987 | Message | 192/41 A |

FOREIGN PATENT DOCUMENTS 699395 11/1953 United Kingdom ............. 192/41 A

Primary Examiner—Dirk Wright
Attorney, Agent, or Firm—Wegner & Bretschneider

[57] ABSTRACT

A one-way sprag clutch is composed of a first and second races arranged concentrically and rotatably relative to each other with a radial interval and having axially-extending annular race surfaces respectively, sprags arranged between the first and second races to transmit torques between the race surfaces, and an annular retainer defining through-holes maintaining the sprags with equal angular intervals. Each of the sprags is formed of a first and second end portions engageable respectively with the race surfaces of the first and second races and a constricted portion extending between the first and second end portions, is constricted in an angular direction and has a cross-section substantially in the form of a peanut shell. The angular width of at least a part of each of the through-holes is narrower than the maximum angular widths of the first and second end portions but is broader than the angular width of the constricted portion.

5 Claims, 5 Drawing Sheets

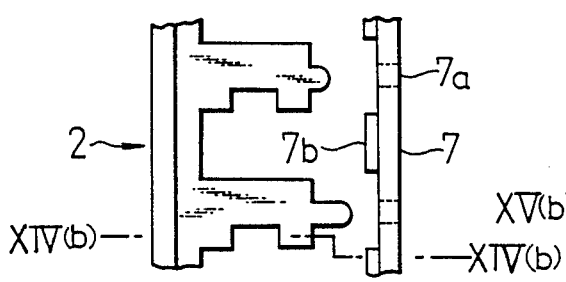
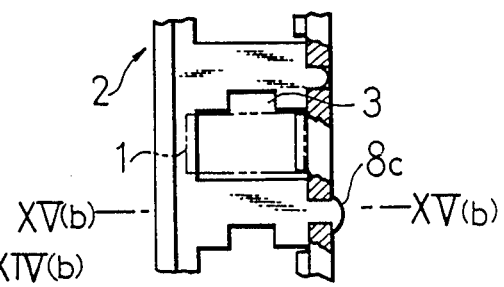
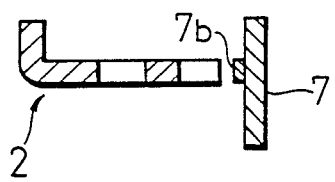
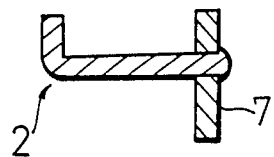
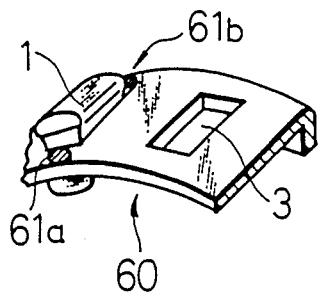

ONE-WAY SPRAG CLUTCH AND ASSEMBLY METHOD OF SPRAGS IN RETAINER

BACKGROUND OF THE INVENTION (1) Field of the Invention

This invention relates to a one-way sprag clutch, and more specifically to a retainer for a way sprag clutch. This invention is also concerned with a method for the assembly of sprags in a retainer.

(2) Description of the Prior Art

In a one-way sprag clutch (hereinafter abbreviated as "OWC" for the sake of brevity), it has conventionally been practised to form windows, i.e., through-holes in a metal retainer and then to insert and maintain sprags in the through-holes.

Since the through-holes have dimensions slightly larger than the angular and axial dimensions of the sprags, the sprags are allowed to pass easily through the through-holes. This feature is convenient for the assembly of the retainers but is accompanied by a problem that the thus-assembled sprags may slip out from the retainer.

As a method for solving the above problem, such sprags have conventionally been prevented from slipping out by means of a spring member having a relatively special shape and made of a special material, such as ribbon spring, because the use of such a retainer alone is insufficient.

It is however the primary function of the spring member to apply a raising moment to the sprags in a direction such that the sprags are brought into engagement with an inner and outer races. When it is desired to remove the sprags from the thus-assembled OWC, the sprags can be removed from the retainer by bending the spring member.

This means that cumbersome, time-consuming and costly handling is required upon assembly, packing and shipping of an OWC and its assembly in a machine and the manufacturing cost of the machine is thus increased.

Where a ribbon spring is supposed to have an additional function to prevent the drop-off of sprags, unavoidable limitations are imposed on the shape of the ribbon spring so that a smaller degree of designing freedom is only available upon making the ribbon spring perform the above-mentioned principal function thereof, namely, upon allowing the ribbon spring to produce a dragging torque sufficient to bring the inner and outer races into engagement.

SUMMARY OF THE INVENTION

With the foregoing in view, the present invention has as a primary object thereof the provision of a one-way sprag clutch which is easy in assembly including handling, can materialize quality assurance, can reduce the manufacturing, handling and mounting costs, and still enjoy improved performance and efficiency.

In order to attain the above-mentioned object, the present inventor conducted an investigation with respect to the shape and dimensions of through-holes of retainers and those of sprags. The following results were obtained accordingly.

In general, the operation of an OWC corresponds its movement from the time of idling to the time of engagement (i.e., the time of application of a torque as a load). Namely, the maximum range of angular movements of each sprag in an OWC is the sum of the range of each angular movement of the sprag when the associated inner and outer races are completely concentric and the distances of extra movements of the sprag in both directions beyond the latter range when the inner and outer races are eccentric. The sum of the above distances is hence a tolerance for possible eccentricity between the inner and outer races.

I has hence been found that the angular width of through-holes of a retainer can be set as desired unless the movement of the sprags is limited within the above-described range of movement of the sprags.

FIG. 9 is a cross-sectional view showing a part of an OWC. The actual positional relationship is shown somewhat exaggeratedly in order to facilitate the illustration of movements of a retainer and an associated sprag.

A sprag 1 has an axial cross-section substantially in the form of a peanut shell. When the sprag 1 is brought into a raised position, the sprag 1 has maximum angular widths A,B (usually A≃B) at both end portions thereof at which the sprag 1 is brought into contact with an outer race 4 and inner race 5. A middle portion of the sprag 1 is formed as a constricted portion and the angular width D of the constricted portion is the minimum angular width of the sprag 1.

A retainer 2 is in the form of a cage, and defines a through-hole 3 which opens radially from the inner wall of the retainer 2 to its outer wall. The angular width of the through-hole 3 is indicated by letter C.

The sprag 1 assumes a position indicated by solid lines during idling but takes a position indicated by dashed lines when engaged (locked). The width C is substantially broader than the width D. Even if the width C is set somewhat narrower than the widths A,B, the sprag 1 is still allowed to move almost freely in the through-hole 3 over the aforementioned range of movement so that the function of the OWC is not impaired.

The cross-sectional shape of the sprags and the dimensions of the through-holes of the retainer can therefore be set as desired, provided that the individual widths are in the following relationship: $A, B < C$ and $D < < C$.

In one aspect of this invention, there is thus provided a one-way sprag clutch composed of a first and second races arranged concentrically and rotatably relative to each other with a radial interval therebetween and having axially-extending annular race surfaces respectively, sprags arranged between said first and second races to transmit torques between said race surfaces, and an annular retainer defining through-holes maintaining said sprags therein with equal angular intervals. Each of said sprags is formed of a first and second end portions engageable respectively with said race surfaces of said first and second races and a constricted portion extending between said first and second end portions and constricted in an angular direction and has a cross-section substantially in the form of a peanut shell. The angular width of at least a part of each of said through-holes is narrower than the maximum angular widths of said first and second end portions but is broader than the angular width of said constricted portion.

In another aspect of this invention, there is also provided a one-way sprag clutch composed of a first and second races arranged concentrically and rotatably relative to each other with a radial interval therebetween and having axially-extending annular race surfaces respectively, sprags arranged between said first and second races to transmit torques between said race surfaces, and an annular retainer defining through-holes maintaining said sprags therein with equal angular intervals. Each of said sprags is formed of a first and second end portions engageable respectively with said race surfaces of said first and second races and a constricted portion extending between said first and second end portions and constricted in an axial direction and has a cross-section substantially in the form of a peanut shell. The axial width of at least a part of each of said through-holes is narrower than the maximum axial widths of said first and second end portions but is broader than the axial width of said constricted portion.

In a further aspect of this invention, there is also provided a method for the assembly of sprags, each of which has a constricted middle part and a cross-section substantially in the form of a peanut shell, in a retainer having an annular first member and a second member having an annular portion and plural tabs extending at right angles from said annular portion. The assembly method comprises:

(i) inserting the constricted middle parts of said sprags respectively into openings defined between said tabs of said second member; and (ii) connecting said second member to said annular first member.

In a still further aspect of this invention, there is also provided a method for the assembly of sprags, each of which has a constricted middle part and a cross-section substantially in the form of a peanut shell, in a retainer having a combination of annular portions and plural connecting portions extending between said annular portions and containing through-holes defined by said annular portions and connecting portions. The assembly method comprises:

(i) cutting off one of said annular portions at points corresponding to said respective through-holes;

(ii) bending the other annular portion to open said through-holes at the cut-off points of said one annular portion, and inserting said sprags between said respective connecting portions; and (iii) bending back said other annular portion so as to close said one annular portion at said cut-off points.

According to the present invention, the first and second end portions of the sprags cannot slip out of their associated through-holes after the sprags are assembled in the retainer. Accordingly, the sprags no longer drop off from the retainer. More specifically, each sprag OWC of this invention has the following advantages:

(a) The assembly is easy and the quality of the product can be improved, because the sprags do not drop off easily after the assembly of the OWC.

(b) It is possible to reduce the expenses which have heretofore been needed for its handling (packing, shipping and mounting) and the like, thereby making it possible to lower the cost of the product.

(c) Since the retainer and sprags are not separable after their assembly, the dragging torque required for the OWC can be set at a value conforming with particular use conditions. The overall performance of the OWC is therefore improved and the performance of a machine with the OWC assembled therein is also improved.

(d) The spring member, which has been required to avoid separation of the retainer from the sprags and vice versa, is now required merely to perform a function to give a dragging torque. The shape of the spring member can thus be simplified and a still more economical material can be used, making a further contribution to the reduction of the manufacturing cost.

(e) When the present invention is applied to an OWC with two retainers, it is possible to prevent so-called pop-out phenomenon in which sprags are forced to enter between the inner and outer retainers.

BRIEF DESCRIPTION OF THE DRAWINGS

The above and other objects, features and advantages of the present invention will become apparent from the following description and the appended claims, taken in conjuction with the accompanying drawings, in which:

FIGS. 14(a) through FIG. 15(b) show a method of this invention for the assembly of a one-way sprag clutch, in which FIG. 14(b) is an axial cross-section taken along lines XIV(b)—XIV(b) of FIG. 14(a) and FIG. 15(b) is an axial cross-section taken along lines XV(b)—XV(b) of FIG. 15(a);

FIG. 16 a fragmentary perspective view of a retainer and sprag in the third embodiment of this invention, showing a further assembly method which relies upon the staking technique.

DETAILED DESCRIPTION OF THE INVENTION AND PREFERRED EMBODIMENTS

Figure 1A:
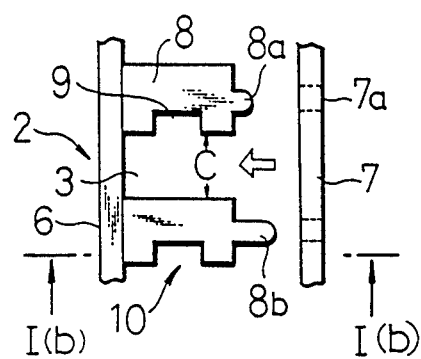
FIG. 1(a) is a plan view of a one-way sprag clutch according to a first embodiment of this invention.

The individual embodiments of this invention will hereinafter be described in detail with reference to the accompanying drawings, in which like elements of structure are indicated by like reference numerals.

Figure 10:
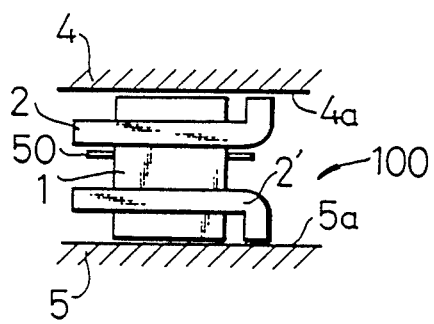
FIG. 10 is a fragmentary axial cross-section showing the structure of a one-way sprag clutch having double retainers.
Figure 11:
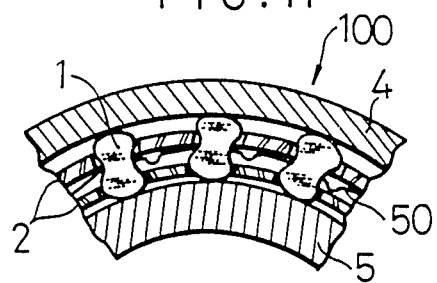
FIG. 11 is a fragmentary radial cross-section of the OWC of FIG. 10.

FIGS. 10 and 11 illustrate the general structure of sprag OWCs each of which is equipped with double retainers.

FIG. 10 is a cross-section of an OWC 100, taken in an axial direction. A first rotary member, namely, an outer race 4 defines a race surface 4a on the inner peripheral wall thereof. Inside the outer race 4, a second rotary member, namely, an inner race 5 is arranged concentrically with the outer race 4. The inner race 5 defines a race surface 5a on the outer peripheral wall thereof. As a result of this construction, the outer race 4 and inner race 5 are rotatable relative to each other with the race surfaces 4a,5a opposing to each other.

Within an annular space defined by the outer race 4 and inner race 5, torque-transmitting members for transmitting torques between the outer and inner races 4,5, namely, sprags 1 having an angular cross-section substantially in the form of a peanut shell are arranged with equal angular intervals. The sprags 1 transmit torques between the outer and inner races 4,5 as needed. The sprags 1 are maintained respectively within substantially-rectangular windows formed in both outer annular retainer 2 and inner annular retainer 2' which are disposed in combination. Arranged between both retainers 2,2' is a spring member, namely, a ribbon spring 50, whereby a raising moment is applied to each of the sprags 1 in a direction that the sprags 1 engage the outer and inner races 4,5.

Referring next to FIGS. 1(a) through 3, the first embodiment of this invention will be described. FIG. 1(a) is a plan view of the retainer 2. The retainer 2 is composed of an annular flange 6 having a radially-extending rim maintained in rotatable contact with the outer race (not shown), a cylindrical portion 10 formed integrally with the annular flange 6 and extending axially almost at a right angle from the annular flange 6, and an annular disk 7 which is a member discrete from the annular flange 6 and cylindrical portion 10. This construction is better illustrated in FIG. 1(b), which is a cross-section viewed in the direction indicated by the arrows I(b), I(b) in FIG. 1. In the cylindrical portion 10 of the retainer 2, plural tabs 8 each of which has an axially-extending short projection 8a at an axial end portion most remote from the flange 6 are arranged in an annular pattern with prescribed constant angular intervals C. A like plural number of through-holes, namely, openings 3 are formed between the tabs 8. The openings 3 in which the sprags 1 are respectively inserted and maintained have a substantially rectangular shape elongated in the axial direction. A notch 9 is formed in a part of edges of each opening 3. The notch 9 is provided to attach a spring member such as ribbon spring (not shown).

Some of the tabs 8 have projections 8b which are longer than the projections 8a. It is necessary to provide at least three projections 8b with equal angular intervals. Axially-extending bores 7a are formed through the annular disk 7. The interval and number of the bores 7 correspond to those of the projections 8a or 8b.

Figure 3:
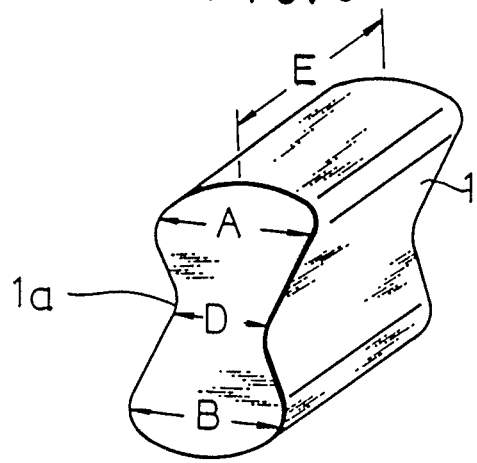
FIG. 3 is a perspective view of a sprag useful in each embodiment of this invention.

A brief description is now made of the shape and dimensions of sprags which are inserted and maintained commonly in the retainer according to each embodiment of this invention. The sprag 1 depicted in FIG. 3 has an angular cross-section substantially in the form of a peanut shell. When inserted and maintained in a retainer, the maximum angular width is represented by a width A or B while the minimum angular width is represented by the width D of a constricted portion 1a. In FIG. 3, A is substantially equal to B (A≃B). The axial width E is substantially longer than the widths A,B. The sprag 1 of the above construction is usually inserted and maintained at the constricted portion 1a in the opening, namely, the window of the retainer and is brought into engagement at both end portions thereof, which have the maximum widths A,B respectively, with the outer and inner races 4,5.

A description will next be made of a process in which the sprags 1 are inserted and maintained in the retainer 2. Each opening 3 of the retainer 2 has a minimum angular width C as shown in FIG. 1(a). The width C is however set broader than the width D of the sprag 1 but narrower than the widths A,B of the sprag 1.

In order to insert and maintain each sprag 2 in the retainer 2, the constricted portion 1a is brought into the opening 3 in a direction indicated by a thick arrow in FIG. 1(a) while maintaining the direction of the width E of the sprag 1 in parallel with the afore-mentioned direction indicated by the thick arrow. Once the sprag 1 is received completely within the opening 3, the sprag 1 no longer slips out of the opening 3 even when the hand is released from the sprag 1 because the width A or B is greater than the width C. Thereafter, the bores 7a of the disk 7 are respectively brought into registration with the projections 8a,8b of the tab 8 and the disk 7 is assembled in the direction indicated by the thick arrow (i.e, in the axial direction) so that the projections 8a,8b are fit in their corresponding bores 7a. The distal end portions of the projections 8a,8b are machined into roundish shapes so as to facilitate the fitting of the projections 8a,8b in the corresponding bores 7a upon assembly of the retainer 2.

In a state in which the disk 7 has been assembled on the cylindrical portion 10 of the retainer 2, the longer projections 8b extend out through their corresponding bores 7a of the disk 7 and distal end portions of the longer projections 8b extend out further axially from the outer wall of the disk 7. By pressing or calking the distal end portions, the disk 7 is fixed completely on the cylindrical portion 10. As a result, the retainer 2 is assembled as an integral unit, and each opening 3 is formed into a window in which the sprag 1 is maintained without drop-off.

Figure 2A:
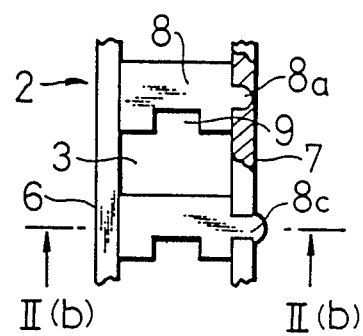
FIG. 2(a) is a plan view showing a retainer in the first embodiment after its assembly.
Figure 1B:
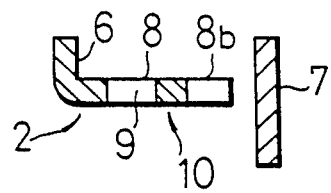
FIG. 1(b) is a cross-section viewed in a direction indicated by arrows I(b),I(b) in FIG. 1(a)
Figure 2B:
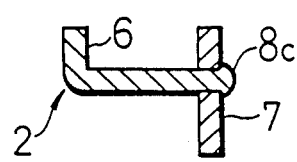
FIG. 2(b) is a cross-section viewed in a direction indicated by arrows II(b),II(b) in FIG. 2(a)

As has already been described above, the longer projections 8b can fully perform its role, i.e., the fixing of the disk 10 so long as at least three longer projections are provided with equal angular intervals. The retainer 2 after its assembly is illustrated in FIGS. 2(a) and 2(b), in which the sprags are omitted.

Figure 4A:
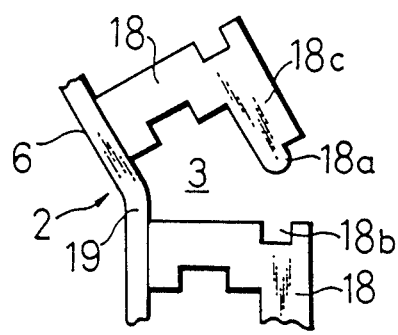
FIG. 4(a) is a plan view of a retainer suitable for use in a second embodiment of this invention, in which the retainer is before its assembly.

The second embodiment of this invention will next be described with reference to FIGS. 4(a) and 4(b). Different from the first embodiment, the retainer in the second embodiment formed as an integral unit. The flange 6, opening 3 and the like are substantially the same in construction and shape as their corresponding elements in the first embodiment. There is however a significant difference in the shape of the tabs 8.

In the second embodiment, the retainer 2 does not have the annular disk 7 of the first embodiment. On the side opposite to the flange 6, the tabs 18 terminate respectively in end portions 18c which extend in a peripheral direction, in other words, in an angular direction so as to define openings 3. Each end portion 18c has a peripherally-, i.e., angularly-extending projection 18a in one of end portions thereof, which also extend in the angular direction, and a substantially rectangular recess 18b extending in an angular direction in the other end portion.

Figure 4B:
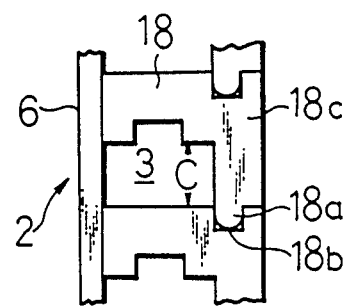
FIG. 4(b) is a plan view of the retainer in the second embodiment, in which the retainer is after its assembly.

The retainer 2 is generally in a state shown in FIG. 4(b) before the sprags 1 are assembled therein. In this state, the projections 18a are fit in the adjacent recesses 18b.

In order to assemble each sprag 1 in the opening 3, the flange 6 is bent about a point 19 on the flange 6 in such directions that the projection 18a and recess 18b are separated. Although the sprag 1 may be inserted in the axial direction, it is more convenient to insert the sprag 1 upwardly into the opening 3 as viewed in FIG. 4(a). After the constricted portion of the sprag 1 has entered the plane of the opening 3, the flange 6 is bent back so that the retainer 2 is brought into a state depicted in FIG. 4(b), in which the sprag 1 is omitted.

In the second embodiment, the minimum angular width C of the opening 3 is also set substantially broader than the width D of the constricted portion of the sprag 1 and is also set narrower than the widths A,B. Since bending stresses are applied to some portions of the flange 6 in the second embodiment, it is necessary to choose a suitable material for the retainer. A hard plastic material having some flexibility or a like material is preferred. It is also preferable to form distal end portions of the projections 18a into a roundish shape so that their fitting into the recesses 18b can be facilitated.

The third embodiment of this invention will next be described with reference to FIGS. 5(a) and 5(b).

In the third embodiment, the angular width C' of each opening 3 of a retainer 20 is set either equal to or somewhat broader than the width D of the sprag 1 (see FIG. 3). The sprag 1 is inserted in the opening 3. In a state that the constricted portion 1a of the sprag 1 is disposed in the plane of the opening 3, staked portions 21a,21b are formed on the outer peripheral surface of the retainer 20 at two locations on one of the angular end edges of the opening 3 [see FIG. 5(a)].

Figure 5A:
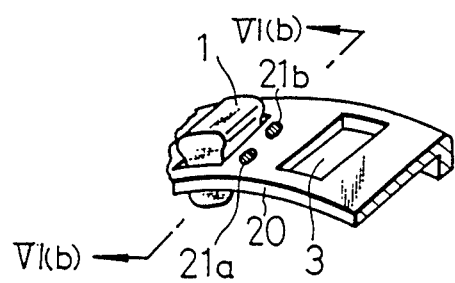
FIG. 5(a) is a fragmentary perspective view of a one-way sprag clutch according to a third embodiment of this invention.
Figure 5B:
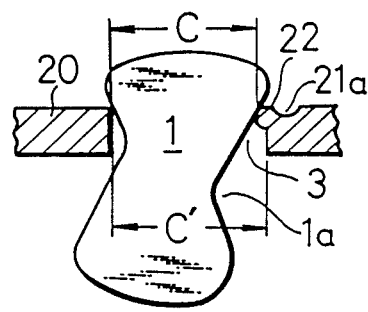
FIG. 5(b) is an axial cross-section showing a sprag and retainer in the third embodiment, in which the retainer has been staked.

When the retainer 20 is staked at these two locations, the staked portion 21a forms a recess and a projection 22 as illustrated in FIG. 5(b). The projection 22 extends angularly into the opening 3. This also applies to the staked portion 21b. As a result, two projections are formed in the opening 3 after the staking operation.

As apparent from FIG. 5(b), the angular width of the opening 3 is C' at the beginning. After the staking operation, the opening 3 becomes narrower at two locations by the distance corresponding to the length of the projections projected into the opening 3. At the narroweddown locations, the width C is substantially greater than the width D of the constricted portion of the sprag 1 but is smaller than the maximum angular widths A,B of the sprag 1. Accordingly, the sprag 1 does not drop off from the opening 3 of the retainer 20 after completion of the staking operation.

Figure 6A:
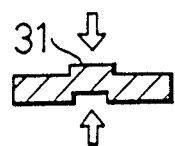
FIG. 6(a) shows a process for staking the retainer in the third embodiment.
Figure 6B:
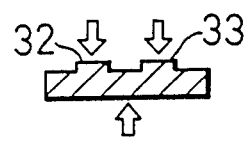
FIG. 6(b) is a cross-section viewed in a direction indicated by arrows VI(b),VI(b) in FIG. 5(a) and illustrates another process for staking the retainer in the third embodiment.

When effecting the above staking operation, it is convenient to form each opening 3 of the retainer 20 as shown in FIG. 6(b) which is a cross-section viewed in the direction indicated by the arrows VIb,VIb in FIG. 5(a). When the retainer 20 is formed into such a cross-sectional shape as shown in FIG. 6(a) or 6(b) and is staked in directions indicated by arrows in the drawing, the staking effects against individual stepped portions 31, 32 and 33 are improved further. The number of the staked portions is not necessarily limited to two. A fewer or greater number of staked portions may be provided. When only one staked portion is provided, it is however necessary to increase suitably the axial length of the staked portion.

Further, the fourth embodiment of this invention will next be described with reference to FIGS. 7, 8 and 9.

When the angular width of each opening of a retainer is set narrower than the maximum angular widths A,B of the sprag 1, the sprag 1 cannot be inserted and assembled directly into the opening. In order to materialize such an assembly, it is therefore necessary to use the construction of the first or second embodiment.

It is however feasible to achieve its assembly by force-fitting, provided that the retainer is made of a suitable material, which can undergo either elastic or plastic deformation, and appropriate machining is applied to the retainer or sprag. This approach has been employed in the fourth embodiment accordingly.

Figure 8:
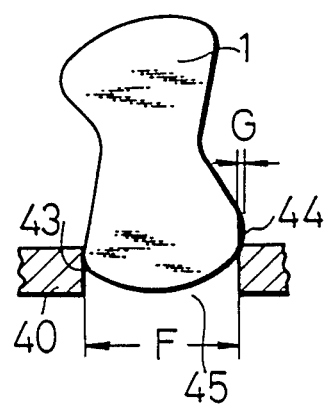
FIG. 8 is also a fragmentary axial cross-section of the one-way sprag clutch according to the fourth embodiment of this invention, in which both end portions of each sprag are tapered to facilitate the assembly of the sprag in its corresponding opening in the retainer.
Figure 9:
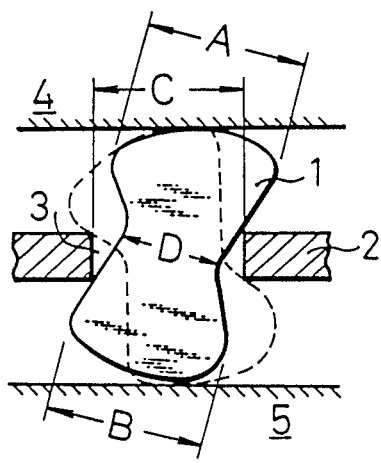
FIG. 9 is a fragmentary axial cross-section showing the relationship among a sprag, retainer and inner and outer races.

As depicted in FIG. 8, the angular width F of each opening 45 of a retainer 40 is set smaller by a width G than the maximum angular width A or B. This width G is equivalent to the extent of deformation of the retainer 40, which took place when the opening 45 was caused to undergo by the sprag 1 elastic deformation or concurrent elastic and plastic deformation in the angular direction and was hence widened. Namely, the angular width of the opening 45 of the retainer 40 is equal to the value of the maximum angular width A or B of the sprag 1 minus the extent of the deformation, namely, G in the fourth embodiment.

Figure 7:
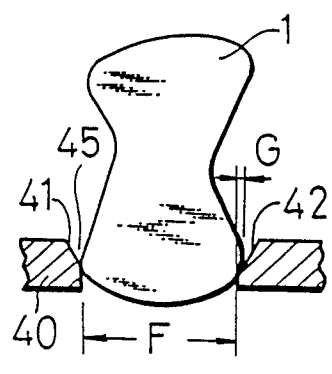
FIG. 7 is a fragmentary axial cross-section of a one-way sprag clutch according to a fourth embodiment of this invention, in which the opposing angular end edges of each opening of a retainer are tapered to facilitate the assembly of a sprag in the opening.

In order to further facilitate the assembly of the sprag 1 into each opening 45 of the retainer 40, tapered portions 41,42 each of which extends oblique from the outer surface of the retainer 40 approximately to the midpoint in the thicknesswise direction are formed in the mutually-opposing angular end edges of the opening 45 of the retainer 40 as shown in FIG. 7. The tapered portions 41,42 may preferably be formed over the entire axial lengths of the angular end edges of the opening 45.

As an alternative, tapered portions may be formed on each sprag 1 without changing the angular end edges of each opening 45. As illustrated in FIG. 8, tapered portions 43,44 are formed on both sides of the leading end portion of the sprag 1. Incidentally, the sprag 1 is inserted downwardly as viewed in each of FIGS. 7 and 8.

Owing to the above-described construction, unduly large force is exerted neither to the sprag 1 nor to the retainer 40. Since the maximum angular widths A and B of the sprag 1 is set greater by the width G than the width F of the opening 45 of the retainer 40, the sprag 1 does not drop off from the opening 45 after its insertion and assembly.

Needless to say, the length, inclination and the like of the tapered portions can be determined as desired in view of the readiness of insertion or the strength of the retainer 40. Obviously, the width D of the constricted portion of the sprag 1 is also set substantially smaller than the width F of the opening 45 in the fourth embodiment.

Finally, the fifth embodiment of this invention will be described. The angular width of each sprag and that of its corresponding opening of each retainer have been dealt with in the first to fourth embodiments. Their axial widths will be dealt with in the fifth embodiment. As illustrated by way of example in FIG. 12, it has been found as a result of a study on the degree of movement required for a sprag that the sprag undergoes relatively less movement at a part thereof. This matter has already been described above with respect to the angular direction. This applies equally to the axial direction of a retainer.

Figure 12:
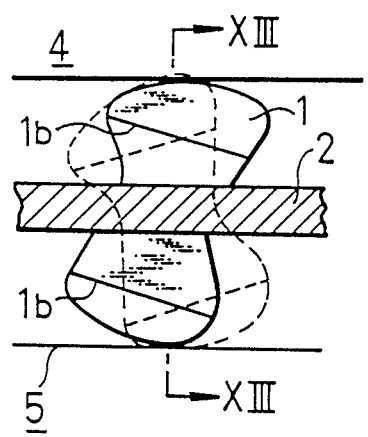
FIG. 12 is a fragmentary radial cross-section of a one-way sprag clutch according to a fifth embodiment of this invention.
Figure 13:
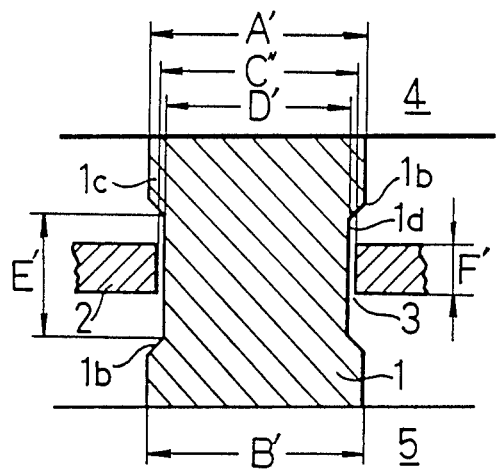
FIG. 13 is a fragmentary axial cross-section of the one-way sprag clutch of the fifth embodiment of this invention, viewed in a direction indicated by arrows XIII,XIII in FIG. 12.

FIG. 13 is a cross-section viewed in the direction indicated by the arrows XIII,XIII in FIG. 12. In this case, the axial width C" of the opening 3 of the retainer 2 is set slightly greater than the minimum axial width D' of the sprag 1 but is chosen to be smaller than the axial widths of both radial end portions of the sprag 1, namely, the maximum axial widths A',B'. In the sprag 1, an end portion 1c and a portion 1d having the minimum axial width are continuous by way of a shoulder portion 1b. It is preferable to set the widths A',B' at substantially the same value.

The sprags 1 do not drop off after their assembly, provided that the width of each opening of the retainer 2 and that of each sprag 1 are set in such dimensions as mentioned above. Nevertheless, the radial width F' (thickness) of the retainer 2 is rendered substantially smaller than the radial width E' of the portion 1d having the minimum axial width in the sprag 1. This dimension has been adopted not to limit the movement of each sprag 1, in other words, not to limit the operation of the one-way clutch.

Specific assembly methods of the fifth embodiment will hereinafter be described. Since the assembly methods of the first to fourth embodiments can be used without modifications, two assembly methods will be described specifically by way of example.

In FIGS. 14(a) through 15(b), the assembly method of the first embodiment is applied as is. The assembly method shown in FIGS. 14(a) through 15(b) is however different from that of the first embodiment in that axial projections 7b are provided with the disk 7 in the former assembly method. As shown in FIG. 15(a), the projections 7b are provided to make the axial width of the openings 3 of the retainer 2 smaller than the axial width of the sprags after the assembly of the retainer 2. The sprags 1 do not therefore drop off from the retainer 2 after their assembly. After the assembly of the sprags 1 in the retainer 2, the retainer 2 is fixed in the same manner as in the first embodiment.

In addition, an assembly method making use of a staking technique is shown in FIG. 16. It is substantially the same as the assembly method of the third embodiment. However, staked portions 61a,61b are provided at both axial end edges. After the staking, the sprags 1 do not drop off from their corresponding openings 3 of a retainer 60.

The two assembly methods have been described with respect to the fifth embodiment. Needless to say, the assembly methods of the second and fourth embodiments may also be applied.

Needless to say, various other changes and modifications can be made to the above-described first to fifth embodiments of this invention.

For example, the present invention can be applied to an OWC equipped with an inner and outer retainers. In this case, either one of the inner and outer retainers is formed into any one of the above-described structures. Alternatively, both retainers may also be formed into any one of the above-described structures. In this case, the sprags are prevented from thrusting into the space between the inner and outer retainers, so that the so-called pop-out of the sprags can be avoided.

Having now fully described the invention, it will be apparent to one of ordinary skill in the art that many changes and modifications can be made thereto without departing from the spirit or scope of the invention as set forth herein.

I claim:

1. In a one-way sprag clutch composed of a first and second races arranged concentrically and rotatably relative to each other with a radial interval therebetween and having axially-extending annular race surfaces respectively, sprags arranged between said first and second races to transmit torques between said race surfaces, and an annular retainer defining through-holes maintaining said sprags therein with equal angular intervals, the improvement wherein each of said sprags is formed of a first and second end portions engageable respectively with said race surfaces of said first and second races and a constricted portion extending between said first and second end portions and constricted in an angular direction and has a cross-section substantially in the form of a peanut shell, and the angular width of at least a part of each of said through-holes is narrower than the maximum angular widths of said first and second end portions but is broader than the angular width of said constricted portion, wherein the angular width of each of said through-holes of said retainer is narrower by the degree of elastic deformation of said retainer than the angular width of said first and second end portions of said sprag.

2. The one-way sprag clutch as claimed in claim 1, wherein said retainer has a pair of annular portions defining both axial end edges of each of said through-holes and portions connecting said annular portions to each other and defining both angular end edges of each of said through-holes, and one of said annular portions is divided into sections at points corresponding respectively to said through-holes land each of said sections is separably fit at both angular end portions thereof with the corresponding angular end portions of its adjacent sections.

3. The one-way sprag clutch as claimed in claim 2, wherein one angular end portion of each of said sections defines a projection and the corresponding angular end portion of its adjacent section defines a matching recess.

4. The one-way sprag clutch as claimed in claim 1, wherein at least one angular end edges of each of said through-holes defines a surface tapered with respect to the thicknesswise direction of said retainer.

5. The one-way sprag clutch as claimed in claim 1, wherein at least one of both angular ends of each of said sprags defines a tapered surface.

* * * * *